(12) United States Patent
Egner-Walter et al.

(10) Patent No.: US 6,902,221 B2
(45) Date of Patent: Jun. 7, 2005

(54) WIPER SYSTEM FOR A WINDOW OF A MOTOR VEHICLE

(75) Inventors: Bruno Egner-Walter, Heilbronn (DE); Wolfgang Scholl, Gemmrigheim (DE)

(73) Assignee: Valeo Systemes D'Essuyage, La Verriere (FR)

( * ) Notice: Subject to any disclaimer, the term of this patent is extended or adjusted under 35 U.S.C. 154(b) by 0 days.

(21) Appl. No.: 10/494,915

(22) PCT Filed: Oct. 31, 2002

(86) PCT No.: PCT/EP02/12151
§ 371 (c)(1),
(2), (4) Date: May 7, 2004

(87) PCT Pub. No.: WO03/039920
PCT Pub. Date: May 15, 2003

(65) Prior Publication Data
US 2005/0017533 A1 Jan. 27, 2005

(30) Foreign Application Priority Data
Nov. 9, 2001 (DE) .......................... 101 55 269

(51) Int. Cl.⁷ ................................. B60S 1/04
(52) U.S. Cl. ................ 296/96.17; 296/96.15; 15/250.001; 15/250.31
(58) Field of Search .............. 296/96.15, 96.17; 15/250.001, 250.14, 250.27, 250.3, 250.31, 250.43, 250.44; 403/24

(56) References Cited

U.S. PATENT DOCUMENTS

| | | | | |
|---|---|---|---|---|
| 6,168,223 B1 | * | 1/2001 | Egner-Walter | ........... 296/96.17 |
| 6,364,570 B1 | * | 4/2002 | Egner-Walter | ............. 403/348 |
| 6,832,802 B2 | * | 12/2004 | Egner-Walter | ........... 296/96.17 |
| 2004/0021335 A1 | * | 2/2004 | Schmid et al. | ........... 296/96.15 |
| 2004/0140687 A1 | * | 7/2004 | Kalchschmidt et al. | .. 296/96.17 |

FOREIGN PATENT DOCUMENTS

| | | | | |
|---|---|---|---|---|
| DE | 198 33 404 A1 | 1/2000 | ............. | B60S/1/24 |
| DE | 199 50 214 A1 | 5/2001 | ............. | B60S/1/02 |
| DE | 100 48 253 A1 | 4/2002 | ............. | B60S/1/02 |
| EP | 1 040 972 A2 | 10/2000 | ............. | B60S/1/04 |
| WO | WO 02/14123 A1 | 2/2002 | ............. | B60S/1/04 |

* cited by examiner

*Primary Examiner*—Patricia L. Engle
(74) *Attorney, Agent, or Firm*—Osha · Liang LLP

(57) ABSTRACT

A wiper arrangement for a windscreen of a motor vehicle having a screwless fixing device, which has at least three fixing members arranged at a distance from one another, two of which lie on a connecting line and the third of which is arranged at a distance from the connecting line, and which includes appropriate receiving devices, in which the fixing members can engage and at least one fixing member includes a thickened section for axial securing. The receiving device of the wiper arrangement includes a recess designed to complement the thickened section and in which the thickened section can be received in the manner of a snap-locking connection.

24 Claims, 4 Drawing Sheets

WIPER SYSTEM FOR A WINDOW OF A MOTOR VEHICLE

CROSS-REFERENCE TO RELATED APPLICATIONS

This application is a national stage application based on International Application No. PCT/EP02/12151 filed Oct. 31, 2002.

FIELD OF THE INVENTION

The present invention relates to a wiper arrangement for a windscreen of a motor vehicle having a screwless fixing device, which has at least three fixing members arranged at a distance from one another, two of which lie on a connecting line and the third of which is arranged at a distance from the connecting line, and which comprises appropriate receiving devices, in which the fixing members can engage, at least one fixing member comprising a thickened section for axial securing.

BACKGROUND OF THE INVENTION

A wiper arrangement of this type is disclosed by DE 198 33 404 A1. The windscreen wiper arrangement disclosed therein comprises a support structure, on which a total of three fixing members, designed as cylindrical socket pins, are provided. These are inserted axially into receiving apertures, which are arranged in special holders fixed to the body of the vehicle. To secure it axially, a socket pin is provided with a thickened section at the free end, this thickened section engaging behind a receiving aperture provided in a rubber socket and thereby preventing the wiper arrangement becoming detached from the motor vehicle.

The screwless socket connection makes the known wiper arrangement very easy to fit and securely prevents it from "falling off" the motor vehicle. This wiper arrangement, however, does not always ensure precise positioning of the fixing members in an axial direction.

SUMMARY OF THE INVENTION

The object of the present invention therefore is to further develop a wiper arrangement of the aforementioned type so that so that it can be precisely positioned in relation to the motor vehicle.

This object is achieved by the features of the pre-characterising clause of claim 1 in that the receiving device comprises a recess designed to complement the thickened section, in which the thickened section can be received in the manner of a snap-locking connection.

The wiper arrangement according to the invention differs from the prior art in that the receiving device has a special recess, which permits a precise positioning of the fixing member and thereby of the wiper arrangement in relation to the receiving device, and therefore in relation to the motor vehicle. At the same time it retains the advantages of a snap-locking connection.

Advantageous developments of the invention are specified in sub-ordinate claims.

In one development the fixing member comprises a socket pin. This is a part which is easy to manufacture and to handle.

In another development the fixing member comprises a damping element, on which the thickened section is arranged. In order to be able to produce a snap-locking connection, a certain flexibility is required, either in the fixing member or in the receiving device. Since a damping element, which is made of an elastic material, is often used in order to prevent vibrations being transmitted between wiper arrangement and motor vehicle, it is particularly advantageous to provide the thickened section on the damping element. This makes the snap-locking connection according to the invention simple and inexpensive to produce.

At the same time, that development in which the fixing member has, in particular, a conical insertion taper at its protruding end is especially preferred. This makes the wiper arrangement easy to fit to the vehicle and increases the speed of assembly when positioning.

It is also advantageous if the thickened section is arranged at an axial distance from the end of the fixing member. This ensures secure guidance of the fixing member in the receiving device not only during assembly but also in the fitted state.

In one simple development of the thickened section, which to a certain extent is tolerant of production tolerances, the thickened section is spherical. In this case the corresponding recess on the receiving device would be hemispherical.

Alternatively the thickened section may be conical. In this case a correspondingly conical recess would have to be provided in the receiving device.

The outstanding feature of another development of the invention is that the receiving device comprises a damping element, which in turn comprises the recess. This also allows the snap-locking connection to exploit the existing flexible characteristics of the damping element.

In this case it is particularly preferred if the recess has an insertion taper, since this facilitates handling when fitting the wiper arrangement and speeds up the fitting operation.

In order to compensate for production tolerances on the part of the wiper arrangement and on that of the fixing device, in a preferred development at least one of the receiving devices is designed as an elongated hole. The corresponding fixing member, for example a socket pin with a spherical or conical thickened section, is then axially secured in a corresponding, complementary recess in the radially inner wall of the elongated hole but is free to move along the extent of the elongated hole.

The present invention also relates to a wiper arrangement of the aforementioned type in which a recess is provided on at least one fixing member, the recess interacting with the receiving device in the manner of a snap-locking connection. Such a wiper arrangement of "reversed" design construction has all the advantages of the wiper arrangement initially described and it also lends itself to the corresponding developments.

Such a wiper arrangement is particularly suitable, however, where the receiving device comprises a sheet-metal neck insert. Such a sheet-metal neck insert is easy and inexpensive to produce and can engage in the corresponding recess in the fixing member.

In order to prevent the exposed edge of the sheet-metal neck insert from damaging the recess on the fixing member and in order to obtain a better support for the fixing member in the receiving device, in a further development the free end of the sheet-metal neck insert is provided with a bent-over section extending radially outwards, preferably one bent over by an angle of approximately 40° to 50°.

The invention finally also relates to a wiper arrangement of the type described above, in which at least one fixing member on the driver's side and one receiving device on the driver's side have the snap-locking connection. In order to give the driver an optimum wiped area, the positioning of the wiper arrangement in respect of the driver's side A-pillar is particularly important. The said development takes account of this, because with this development the precise positioning afforded by the snap-locking connection is provided at least on the driver's side fixing member and the corresponding receiving device.

Examples of embodiments of the invention will be explained in detail below with reference to the drawing attached, in which:

DETAILED DESCRIPTION

Figure 1:
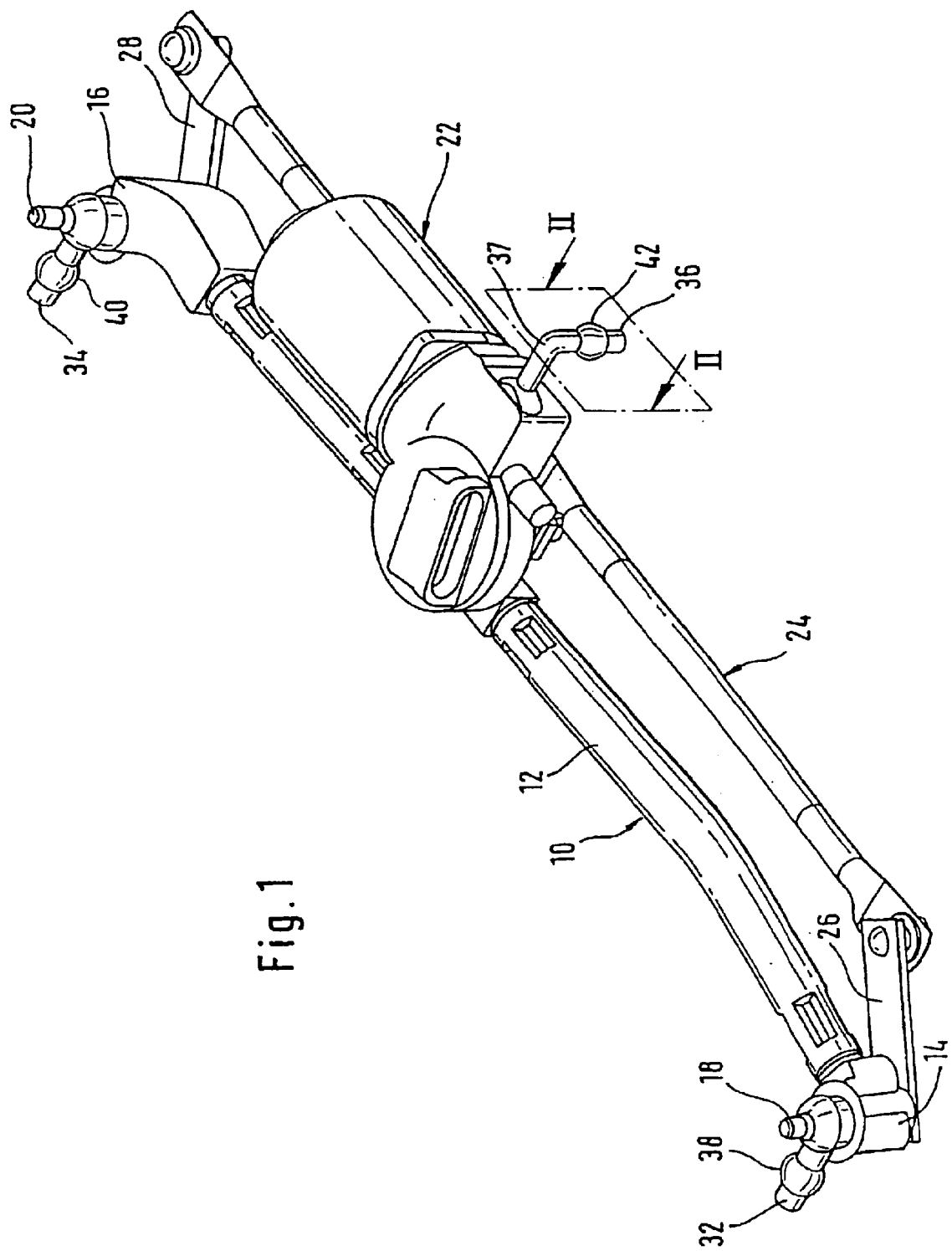
FIG. 1: shows a perspective view of a windscreen wiper arrangement having a screwless fixing device, but without any receiving device.

A windscreen wiper arrangement for a motor vehicle in FIG. 1 carries the overall reference number 10. It comprises a rod-like supporting body 12, which at both ends supports a bearing body 14 and 16 respectively. A wiper shaft 18 and 20 for receiving a windscreen wiper arm is axially secured and rotatably supported in each bearing body 14 and 16 respectively.

Seated on the supporting body 12, approximately on its centre section, is a drive device 22, which operates a connecting linkage 24. One end of the connecting linkage 24 is articulated to a link 26, which is in turn rigidly coupled to the wiper shaft 18. The other end of the connecting linkage 24 is articulated to a link 28, which is rigidly connected to the wiper shaft 20.

The windscreen wiper arrangement 10 can be fixed to a motor vehicle by means of a screwless socket connection beneath a windscreen (not shown) of a vehicle body. For this purpose each bearing body 14, 16 carries a cylindrical socket pin 32, 34, which projects from the bearing bodies 14 and 16 parallel to one another and in the same direction and at right-angles to the wiper shafts 18 and 20. A further cylindrical socket pin bears the reference number 36 and is rigidly fixed to a spacer element 37 on that side of the drive device 22 remote from the supporting body 12.

Whilst the socket pins 32 and 34 lie approximately in the plane spanned by the supporting body 12 and the connecting linkage 24, the socket pin 36 stands at right-angles to this plane, that is to say also at right angles to the longitudinal extent of the two socket pins 32 and 34. Overall, the socket pins 32, 34, 36 lie at the vertices of a triangle and form a stable support base.

Approximately midway along their longitudinal extent the socket pins 32, 34, 36 each have a spherical thickened section 38, 40 and 42 respectively. In the example of the socket pin 36 shown in FIG. 2 this is fixed in a receiving device 39, which has a receiving aperture 41. The socket pins 32 and 34 are correspondingly fixed.

The spherical thickened section 42 on the socket pin 38 engages in a corresponding, complementary hemispherical recess 44 in the receiving aperture 41, which is provided in a rubber socket 46. In its outer peripheral wall the rubber socket 46 has an annular groove 48, into which a retaining plate 42 having an aperture 50 engages. The retaining plate 52 is fixed to the vehicle, for example by spot welding. In one example of an embodiment (not shown), however, the aperture 50 may also be provided in a structural plate of the vehicle, so that an additional retaining plate can be dispensed with.

Figure 2:
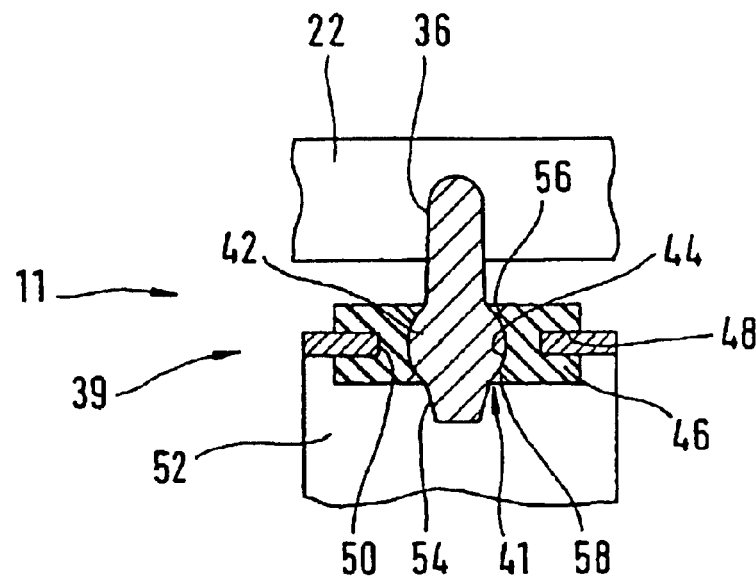
FIG. 2: shows a section through the plane II—II in FIG. 1, a receiving device also being represented.

As can be seen from FIG. 2, the socket pin 36 at its protruding axial end has a conical insertion taper 54. Analogously with this, insertion tapers 56 and 58 are provided on the receiving aperture 41 in the rubber socket 46 above and below the hemispherical recess 44. The same naturally also applies to the socket pins 32 and 34 and the corresponding rubber sockets.

In order to fix the windscreen wiper arrangement 10 to a vehicle, the socket pin 36 is now simply inserted into the receiving aperture 41 in the rubber socket 46. The elasticity of the rubber socket 46 means that it is expanded by the spherical thickened section 42 until the latter is received in the hemispherical recess 44 in the manner of a snap-locking connection. The insertion tapers 54, 56, and 58 facilitate insertion (the lower insertion taper 58 makes it easier to draw the socket pin 36 back in the event that it has been inserted too far into the receiving aperture 41 in the rubber socket 46). A similar procedure is followed with the socket pins 32 and 34. In this way it is possible to achieve a precise and at the same time firm positioning of the windscreen wiper arrangement 10 in relation to the vehicle.

In the second example of an embodiment represented in FIG. 3 parts performing an equivalent function to parts described in connection with FIG. 2 carry the same reference numbers and are not described in more detail here.

In contrast to the first example of an embodiment, the thickened section 42 in this case is of conical rather than spherical shape. The same likewise applies to the complementary recess 44 in the receiving aperture 41 in the rubber socket 46. In this way the socket pin 36 is secured even more firmly in the rubber socket 46, preventing it being pulled out of the receiving aperture 41.

Figure 3:
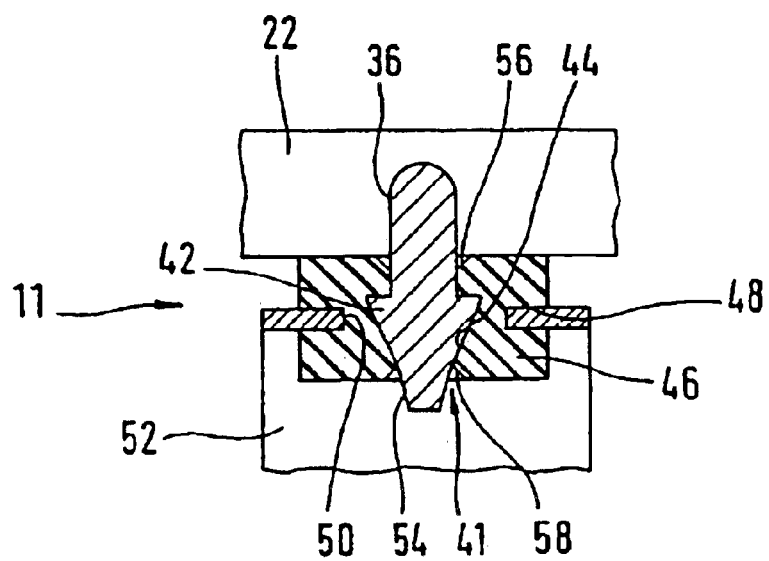
FIG. 3: shows a view similar to that in FIG. 2 of a second example of an embodiment of a wiper arrangement.
Figure 4:
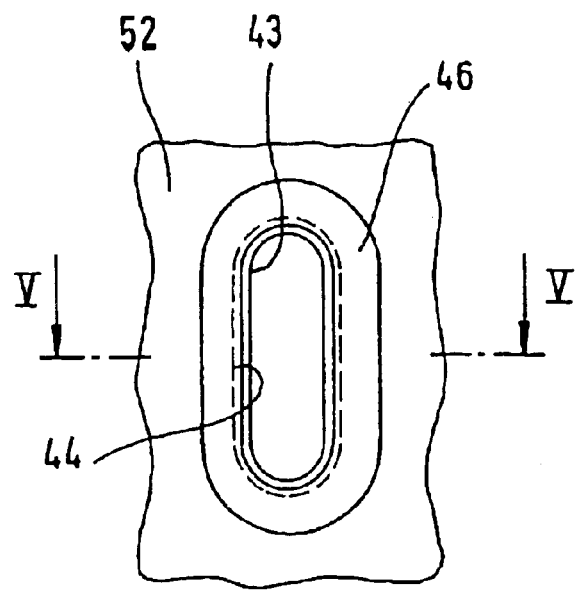
FIG. 4: shows a top view of a third example of an embodiment of a receiving device for a wiper arrangement.
Figure 5:
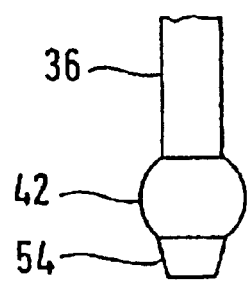
FIG. 5: shows a sectional view along the line V—V in FIG. 4, a fixing member also being represented.
Figure 5:
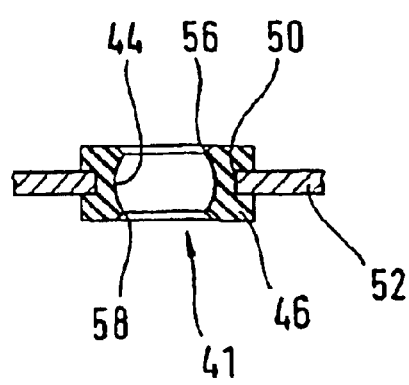

The remarks concerning reference numbers etc. made with regard to FIG. 3 apply analogously to FIGS. 4 and 5. Although the thickened section 42 in the example of an embodiment represented in FIGS. 4 and 5 is spherical and the corresponding recess 41 hemispherical, the receiving aperture 42 in the rubber socket 46 is, like the aperture 41 in the retaining plate 52, designed as an elongated hole. In this way it is possible to compensate for production tolerances on the windscreen wiper arrangement 10 and in the distance between the receiving devices 39 on the vehicle side. It should be pointed out here that the thickened section can also be provided on a flexible damping element which is pre-fitted to a socket pin.

Figure 6:
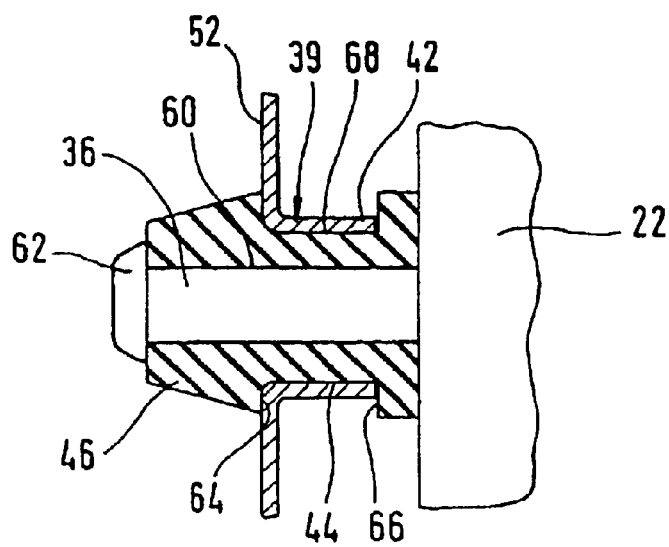
FIG. 6: shows a sectional view through a fourth example of an embodiment of a fixing device for a wiper arrangement.
Figure 7:
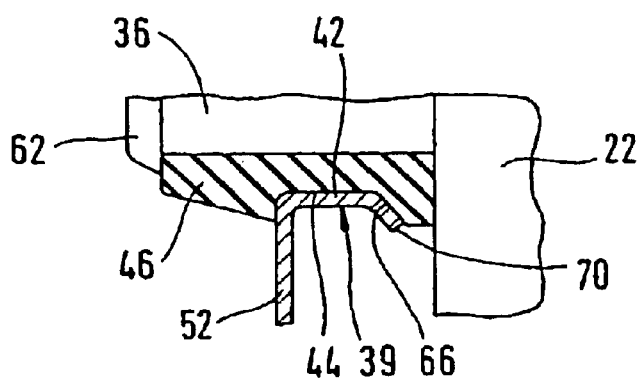
FIG. 7: shows a sectional view similar to that in FIG. 6 of a fifth example of an embodiment.
Figure 8:
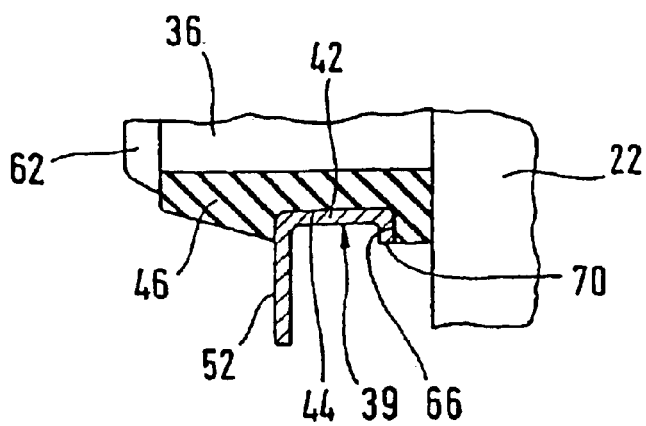
FIG. 8: shows a sectional view similar to that in FIG. 6 of a sixth example of an embodiment.

The remarks concerning reference numbers etc. made with regard to FIG. 3 again apply analogously to the examples of embodiment represented in FIGS. 6 to 8.

The socket pin 36, as can be seen from FIG. 6, has an essentially cylindrical, annular recess 60, such that a conical cap 62 is formed at the protruding end of the socket pin 36. The socket pin 36 is furthermore fitted directly to the drive device 22. The recess 60 is therefore formed between the cap 62 and the drive device 22.

A damping element 46 made of an elastic material, into the radially outer circumferential surface of which an annular groove 44 is formed, is pushed or moulded on to the socket pin 36. The axial boundary faces 64 and 66 of the groove 44 are perpendicular to the base surface 68 of the groove 44.

The receiving device 39 on the vehicle side consists of a sheet-metal neck insert, which forms a tubular section 42. The inside width of the tubular section 42 is approximately equal to the diameter of the groove 44 in the damping element 46.

To fix the windscreen wiper arrangement 10 to the vehicle (not shown), the damping element 46 is first pushed over the cap 62 on to the socket pin 36. The socket pin 36 with the damping element 46 is then inserted into the corresponding receiving device 39 with the sheet-metal neck insert forming the tubular section 44. The tubular section 44 then snaps into the groove 44, thereby snap-locking the windscreen wiper arrangement 10 securely to the vehicle.

In the example of an embodiment represented in FIG. 6, axial oscillations of the socket pin 36 in relation to the retaining plate 52 can, under unfavourable operating conditions, result in damage to the damping element 46 in the area of the joint between the free end of the tubular section 42 and the lateral face 66 of the grove 44 in the damping element 46. In order to avoid this, in the examples of embodiment represented in FIGS. 7 and 8, sections 70 bent over radially outwards are provided at the free end of the tubular section 42, these sections being bent over by an angle of approximately 45° in the example of embodiment represented in FIG. 7 and by an angle of approximately 90° in the example of embodiment represented in FIG. 8.

In FIGS. 2 to 8, the various examples of embodiment have been explained throughout using the "middle" socket pin 36 and the corresponding receiving device 39 as an example. Not shown in the drawing, but particularly preferred, however, is a design in which this snap-locking connection is provided on the driver's side fixing member and the driver's side receiving device. This is preferred because the precise positioning of the windscreen wiper arrangement in relation to the driver's side A pillar is of primary interest owing to the importance of an optimum wiped area for the driver. In the case of the windscreen wiper arrangement 10 represented in FIG. 1 this would therefore relate to the socket pin 34.

What is claimed is:

1. A wiper arrangement for a windscreen of a motor vehicle having a screwless fixing device, which has at least three fixing members arranged at a distance from one another, two of which lie on a connecting line and the third of which is arranged at a distance from the connecting line, and which comprises appropriate receiving devices, in which the fixing members can engage, at least one fixing member comprising a thickened section for axial securing, characterized in that the receiving device comprises a recess which is designed to complement the thickened section and in which the thickened section can be received in the manner of a snap-locking connection.

2. The wiper arrangement according to claim 1, characterized in that the fixing member comprises a socket pin.

3. The wiper arrangement according to claim 2, characterized in that the fixing member comprises a damping element and the thickened section is provided on the damping element.

4. The wiper arrangement according to claim 2, characterized in that the fixing member has an insertion taper at its protruding end.

5. The wiper arrangement according to claim 4, characterized in that the insertion taper is conical.

6. The wiper arrangement according to claim 2, characterized in that the thickened section is situated at an axial distance from the end of the fixing member.

7. The wiper arrangement according to claim 1, characterized in that the fixing member comprises a damping element and the thickened section is provided on the damping element.

8. The wiper arrangement according to claim 1, characterized in that the fixing member has an insertion taper at its protruding end.

9. The wiper arrangement according to claim 8, characterized in that the insertion taper is conical.

10. The wiper arrangement according to claim 1, characterized in that the thickened section is situated at an axial distance from the end of the fixing member.

11. The wiper arrangement according to claim 1, characterized in that the thickened section is spherical.

12. The wiper arrangement according to claim 1, characterized in that the thickened section is conical.

13. The wiper arrangement according to claim 1, characterized in that the receiving device comprises a damping element which comprises the recess.

14. The wiper arrangement according to claim 1, characterized in that the receiving device has an insertion taper.

15. The wiper arrangement according to claim 1, characterized in that at least one of the receiving devices is designed as an elongated hole.

16. The wiper arrangement according to claim 1, characterized in that the receiving device comprises a sheet-metal neck insert.

17. The wiper arrangement according to claim 16, characterized in that a section bent over outwards is provided at the free end of the sheet-metal neck insert.

18. The wiper arrangement according to claim 17, characterized in that at least one driver's side fixing member and one driver's side receiving device have the snap-locking connection.

19. The wiper arrangement according to claim 17, characterized in that the section which is bent over outwards is approximately 40 to 50°.

20. A wiper arrangement for a windscreen of a motor vehicle having a screwless fixing device, which has at least three fixing members arranged at a distance from one another, two of which lie on a connecting line and the third of which is arranged at a distance from the connecting line, and which comprises appropriate receiving devices, in which the fixing members can engage, characterized in that a recess, which interacts with the receiving device in the manner of a snap-locking connection, is provided on at least one fixing member.

21. The wiper arrangement according to claim 20, characterized in that the receiving device comprises a sheet-metal neck insert.

22. The wiper arrangement according to claim 21, characterized in that a section bent over outwards is provided at the free end of the sheet-metal neck insert.

23. The wiper arrangement according to claim 22, characterized in that the section which is bent over outwards is approximately 40 to 50°.

24. The wiper arrangement according to claim 20, characterized in that a least one driver's side fixing member and one driver's side receiving device have the snap-locking connection.

* * * * *